United States Patent

Perry

(10) Patent No.: US 9,529,416 B2
(45) Date of Patent: Dec. 27, 2016

(54) RACK SPACE POWER UTILIZATION

(71) Applicant: Sony Computer Entertainment America LLC, San Mateo, CA (US)

(72) Inventor: David Perry, Dana Point, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/631,621

(22) Filed: Feb. 25, 2015

(65) Prior Publication Data

US 2016/0246349 A1    Aug. 25, 2016

(51) Int. Cl.
*G06F 1/32* (2006.01)
*G06F 1/00* (2006.01)
*G06F 9/48* (2006.01)

(52) U.S. Cl.
CPC ............ *G06F 1/329* (2013.01); *G06F 1/3203* (2013.01); *G06F 1/3296* (2013.01); *G06F 9/48* (2013.01)

(58) Field of Classification Search
CPC ........... G06F 9/48; G06F 1/3296; G06F 1/329
See application file for complete search history.

(56) References Cited

U.S. PATENT DOCUMENTS

| | | | |
|---|---|---|---|
| 6,278,701 B1 * | 8/2001 | Ayyagari | H04B 7/264 370/310 |
| 2008/0184230 A1 * | 7/2008 | Leech | G06F 9/505 718/100 |
| 2013/0260896 A1 | 10/2013 | Miura et al. | |
| 2013/0318521 A1 * | 11/2013 | Monaghan | H04L 63/107 718/1 |
| 2014/0073428 A1 | 3/2014 | Perry et al. | |
| 2014/0106884 A1 | 4/2014 | Perry et al. | |
| 2014/0179424 A1 | 6/2014 | Perry et al. | |
| 2014/0179427 A1 | 6/2014 | Miura et al. | |
| 2014/0179428 A1 | 6/2014 | Miura et al. | |
| 2014/0179439 A1 | 6/2014 | Miura et al. | |
| 2014/0187318 A1 | 7/2014 | Gallizzi et al. | |
| 2014/0187323 A1 | 7/2014 | Perry | |
| 2014/0364208 A1 | 12/2014 | Perry | |

\* cited by examiner

*Primary Examiner* — Camquy Truong
(74) *Attorney, Agent, or Firm* — Joshua D. Isenberg; JDI Patent

(57) ABSTRACT

Instances of the one or more computer processing applications are allocated to a subset of terminal processing systems in a plurality of terminal processing systems that are coupled to a network. Each application may be accessed by one or more remote client devices via the network. Each client device has one or more associated users. Each application has an associated power consumption profile and the instances are allocated to the terminal processing systems in accordance with the power consumption profiles and an aggregate power consumption capacity for the plurality of terminal processing systems. The instances are allocated to the terminal processing systems in a way that optimizes a number of users per unit power allocated to the plurality of terminal processing systems.

10 Claims, 4 Drawing Sheets

RACK SPACE POWER UTILIZATION

FIELD

Aspects of the present disclosure relate to distributed computing. Further aspects of the present disclosure relate to power management in distributed computing.

BACKGROUND

Cloud computing has been adopted in a wide variety of computing services, including remote data storage solutions, music and video streaming services, and a wide variety of other consumer and business solutions. In general, cloud computing provides several well-known benefits, including increased efficiencies through the use of shared resources, increased flexibility in accessing content without restriction to a particular device, lower up-front costs when hardware upgrades become available, and other advantages.

A server facility generally includes a plurality of racks located in a building. Each rack may contain a plurality of processing systems, sometimes referred to herein as terminal systems. Some terminal systems may include specially configured processing hardware that can run on or more applications. Some terminal systems may include large scale storage systems for data storage. The server facility may include a server controller that distributes the processing and or storage load to the terminal systems. The server controller and terminal systems are coupled to a network via corresponding network interfaces. Remotely located users can access processing or storage capabilities of the terminal systems in the racks via the network.

The terminal systems are operated by application service providers. A given application service provider may have one or more terminal systems in one or more of the racks at the server facility. In some cases, all of the terminal systems in all of the racks at a given facility may be dedicated to a single application service provider.

The application service provider often does not own the server facility that provides the rack space for its terminal systems, although it may own the terminal systems in the racks. More commonly, a separate server facility provider operates and maintains the server facility and one or more application service providers rent space in the racks for their terminal systems. The server facility provider may provide the racks, the electrical power to the racks, and cooling for the racks. The server facility provider's cost of running the server facility depends partly on the electrical power used to run the systems on the racks and partly on the cost of cooling the racks. Depending on the amount of heat generated by all of the racks in the server facility and the thermodynamic efficiency of the cooling system, the latter cost can be significantly larger the cost of running the systems on the racks. Furthermore, it is common for the server facility provider to charge the users of the racks a flat fee per month to cover the cost of cooling.

Many application service providers, e.g., social networks or online gaming services, require large numbers of terminal systems to accommodate large numbers of users. Such large application service providers often distribute their terminal systems among several server facilities. This may be done to distribute their terminal systems geographically to provide redundancy and security.

It is within this context that the present disclosure arises.

SUMMARY

According to aspects of the present disclosure, instances of the one or more computer processing applications may be allocated to a subset of terminal processing systems in a plurality of terminal processing systems that are coupled to a network. Each application may be accessed by one or more remote client devices via the network. Each client device has one or more associated users. Each application has an associated power consumption profile and the instances are allocated to the terminal processing systems in accordance with the power consumption profiles and an aggregate power consumption capacity for the plurality of terminal processing systems. The instances are allocated to the terminal processing systems in a way that optimizes a number of users per unit power allocated to the plurality of terminal processing systems.

BRIEF DESCRIPTION OF THE DRAWINGS

The teachings of the present disclosure can be readily understood by considering the following detailed description in conjunction with the accompanying drawings, in which.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

According to aspects of the present disclosure, it is possible to calculate limitation on the power usage of a given rack for one or more applications and balance the power load at the rack according to the power profile of each application its user or users. Each power profile may be characterized, e.g., by a peak power usage for the application, average power utilization, and distribution characteristic (e.g., standard deviation) for power utilization. The application service provider can then get more use out of each of its racks by optimizing the distribution of the processing load to its racks based on the power use profiles to accommodate the greatest number of users per unit power. With a known processing load distribution for a given rack or series of racks, an application service provider can pre-load and boot up applications on the rack or racks based on anticipated demand and assign users to those applications as users request access to the applications.

In some implementations, applications may be assigned to terminal systems with an aggregate peak power in excess of a power capacity for a rack if historical power use data predicts that the aggregated power usage is unlikely to exceed the power capacity.

Figure 1A:
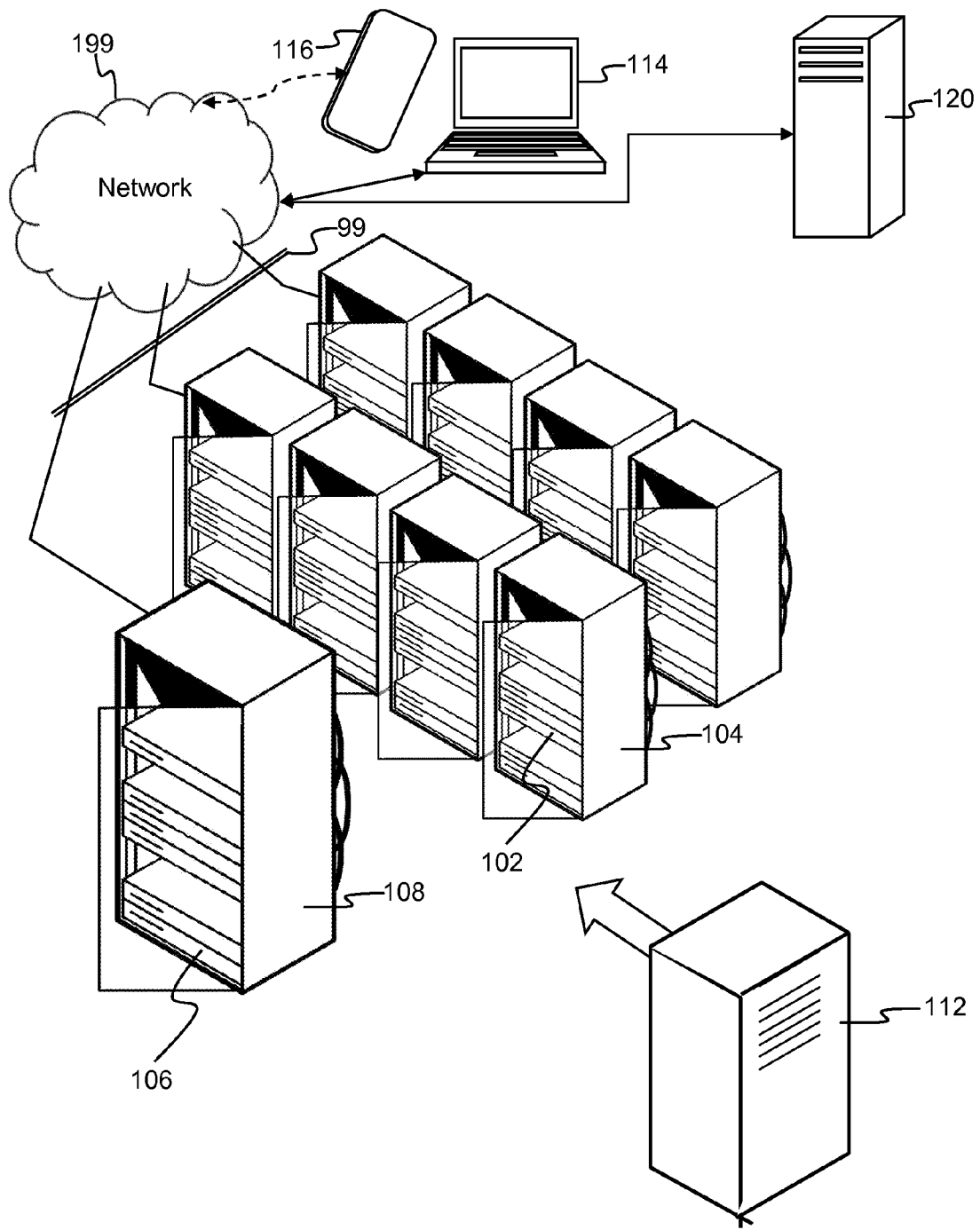
FIGS. 1A-1B are schematic diagrams illustrating the concept of a Data Center for remote computing within the context of aspects of the present disclosure.
Figure 1B:
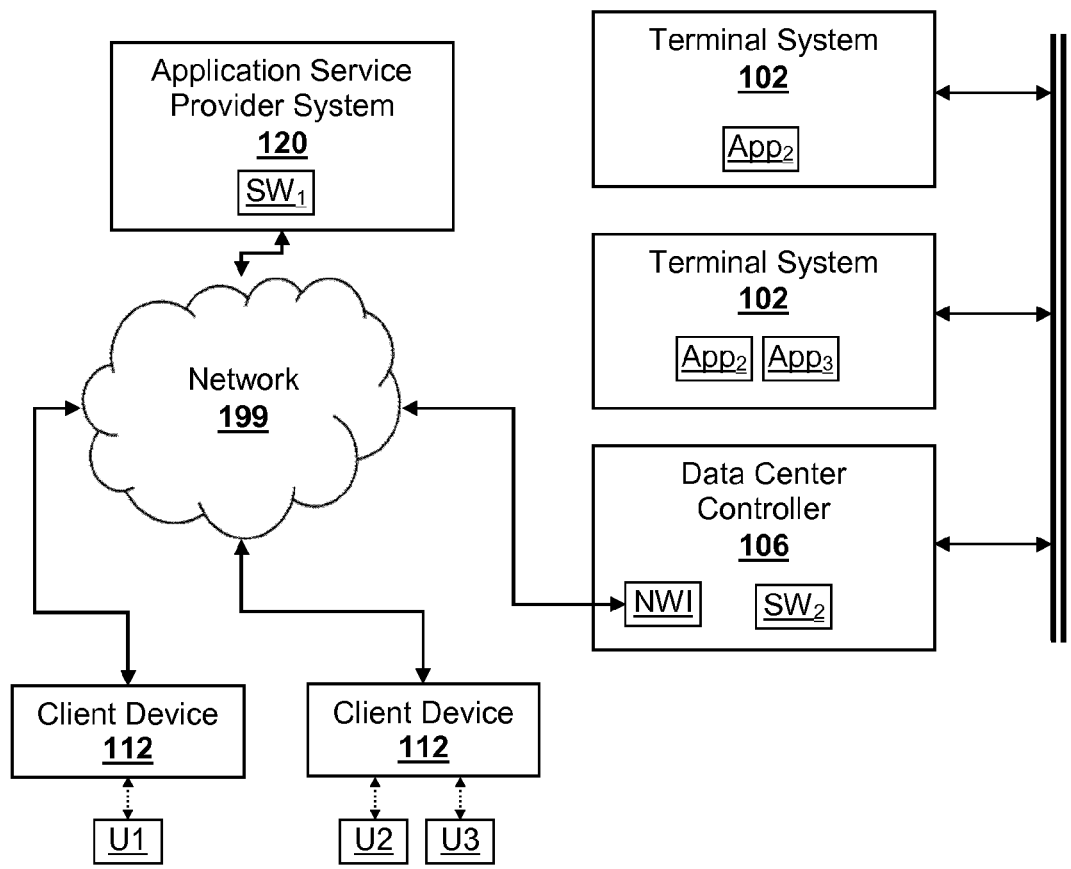

To better illustrate various aspects of the present disclosure, a first illustrative example of a Data Center 100 is depicted in FIG. 1A and FIG. 1B. The Data Center 100 a plurality of computing devices referred to herein as terminal systems 102 connected over a network 199, such as the internet. The terminal systems 102 are mounted in racks 104 with each rack accommodating a finite number of terminal systems. The Data Center 100 may also include one or more Data Center Controllers 106, which may be located in dedicated racks 108. The terminal systems 102 and Data Center Controllers 106 may individually utilize a relatively small amount of power depending on the processing load, e.g., a few watts to about 100 watts, but the overall power load on a Data Center 100 having hundreds of racks 104, each with tens of terminal systems 102 can potentially exceed 1 Megawatt. Also, terminal systems 102 and Data Center Controllers 106 collectively generate large amounts of heat, which could be detrimental to the operation of processing components of these systems. The Data Center 100 therefore typically includes a cooling system 110, e.g., an air conditioning system, to keep these processing systems cool.

The terminal systems 102 may communicate with the Data Center Controllers 106 and with each other via a local communication link 99, such as a data bus or local area network (LAN). The terminal systems 102 and the Data Center Controllers 106 may communicate with remote client devices 112 via the network 199. The client devices 112 may include computing systems 114, e.g., personal computers, laptop computers, specially configured gaming consoles, or other network capable devices. The client device 112 may also include mobile devices, such as smart phones, tablet computers, portable game devices. In some implementations each terminal system 102 may be configured to communicate with the client devices 112 over the network directly. In other implementations, the Data Center Controllers 106 may manage network communication between the terminal systems and the client devices via a network interface NWI.

The terminal systems 102 may be configured to provide processing power and/or data storage space for the client devices. Users U1, U2, U3 may request access to such terminal system resources through the client devices 112. Each user may have a dedicated client device. Alternatively, some client devices may accommodate two or more users. The terminal systems 102 may be configured to provide specialized services that utilize the terminal systems' resources, e.g., data processing and/or data storage resources, by executing software programs $App_1$, $App_2$, $App_3$, referred to herein as applications. Execution of an application on a terminal system for a user is referred to herein as an "instance of an application or an "application instance". A user may have more than one instance of the same application running on one or more terminal systems at a given time. Some users may have instances of two or more different applications running on one or more terminal systems 102 at the same time.

The data center controllers 106 may execute software $SW_1$ to manage the allocation of application instances to the terminal systems 102 in response to requests from the users U1, U2, U3 via the client devices 112. For example, data center controllers 106 may store copies of application software and distribute copies to the terminal systems 102 as instances are allocated. In some implementations, a remote Application Service Provider System 120 may communicate with the Data Center 100 and client devices 112 via the network 199 and remotely manage allocation of application instances for applications associated with the provider system. The Application Service Provider System 120 may execute software $SW_2$ to manage the allocation of application instances to the terminal systems 102. Although only a single Application Service Provider System 120 is shown in FIGS. 1A-1B, those skilled in the art will recognize that there may be multiple Application Service Provider Systems 120 that may manage allocation of application instances for different corresponding applications.

As noted above, the Data Center 100 and Application Service Provider System 120 are often owned or operated by different entities. A key concern for the operator of the Data Center 100 and the Application Service Provider System 120 is power consumption. The operator of the Data Center 100 has a variable power cost due to the power need to run the terminal systems 102 and Data Center Controllers 106 and a fixed to power and maintain the cooling system. The Data Center operator passes these costs on to the Application Service Provider(s), often in the form of fixed rent per rack. The Application service provider typically needs to accommodate the greatest number of users for the cost of renting a given rack 104. However, a given rack typically cannot accommodate an unlimited number of terminal systems or application instances. Furthermore, a given rack 104 typically has a limit on the amount of power it can provide to the terminal systems 102 within the rack.

Aspects of the present disclosure recognize that not all applications or application instances require the same amount of power from a given terminal system. Given this understanding, it is possible to optimize the allocation of application instances to a given set of terminal systems in a data center to optimize power utilization.

System

Figure 2:
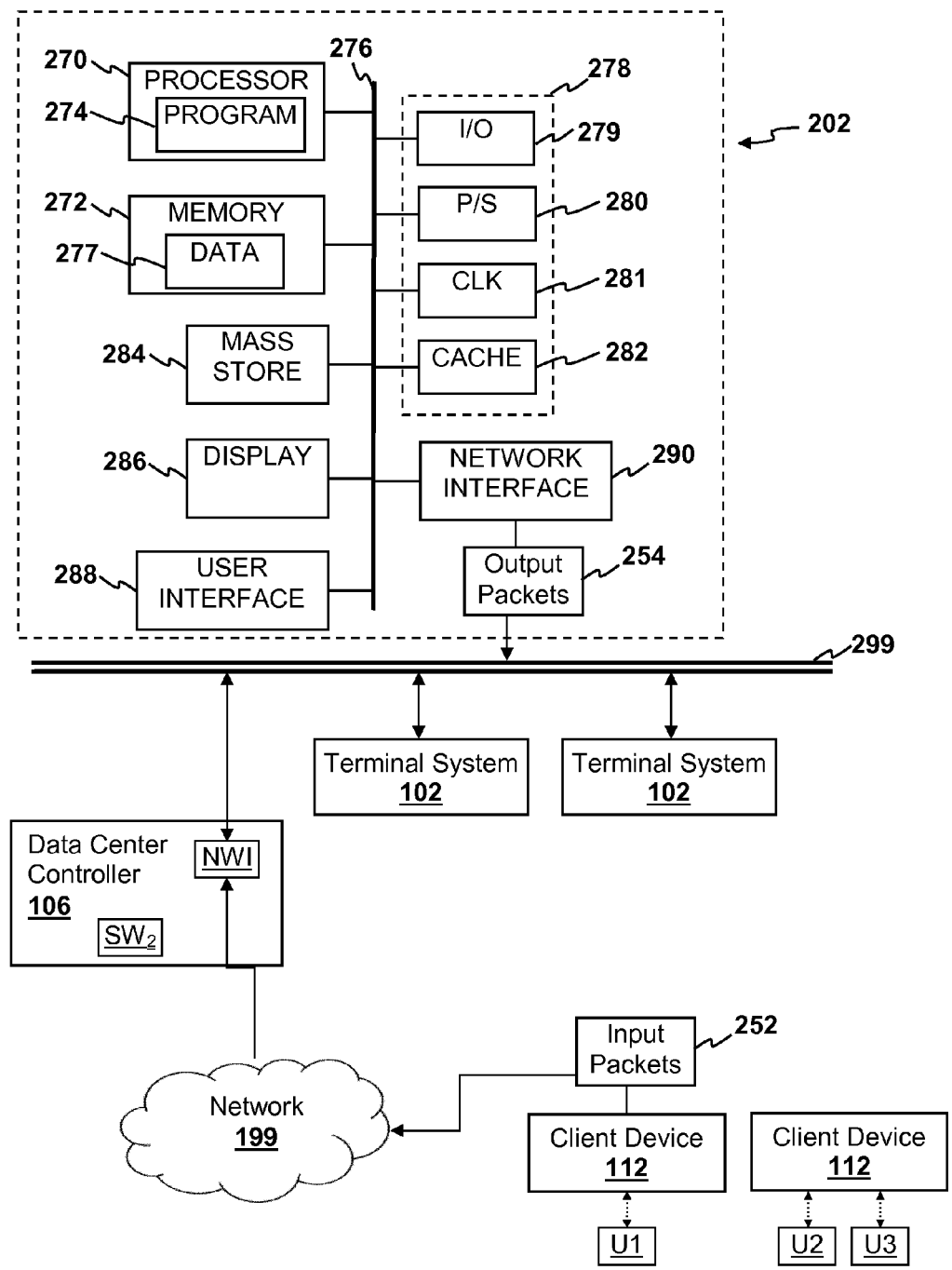
FIG. 2 is a schematic diagram illustrating an example of a computing system configured to implement power utilization distribution in accordance with aspects of the present disclosure.

Certain aspects of the present disclosure include systems configured to implement power utilization distribution in a way that accommodates an optimum number of users per unit power. By way of example, and not by way of limitation, FIG. 2 schematically depicts a possible computing system 202 configured to implement power utilization distribution in accordance with certain aspects of the present disclosure. In certain implementations, the computing system 202 may have one or more aspects in common with one or more of the Data Processing Center Control System 106 or the Application Service Provider System 120 described above with respect to FIG. 1A and FIG. 1B. In certain implementations, the computing system 202 may be configured with suitable software and/or hardware to implement various aspects of the methods described below with respect to FIG. 3. The system 202 may be a server, an embedded system, mobile phone, personal computer, laptop computer, tablet computer, portable game device, workstation, game console, wearable device such as a smart watch, and the like.

In accordance with certain implementations, the system 202 may be part of a Data Center 200, e.g., a cloud computing server and may be configured to provide a data stream to a client device over a network 199 using a suitable computer network communication protocol. By way of example, and not by way of limitation, the Data Center 200 may be configured to provide a real-time data stream, such as a real-time audio stream, a real-time video stream, or a real-time audio/video stream to the at least one client device over the network 199, which may be a wide area network (WAN), such as the internet. In the illustrated example, the system 202 may communicate with other systems in the data center 200 via a local communication link 299, such as a data bus or local area network (LAN). The system 202 may be connected to the network 199 via the local communication link 299 and a network interface NWI, which may be implemented by a Data Center Controller 108.

The system 202 may be configured to receive input data via the network 199 from one or more remote client devices 112 in the form of input packets 252. The system 202 may perform processing on data in the input packets and generate a corresponding output, which may be transmitted to the client devices 112 in the form of output packets 254.

The system 202 may include one or more processor units 270, which may be configured according to well-known architectures, such as, e.g., single-core, dual-core, quad-core, multi-core, processor-coprocessor, cell processor, and the like. The system 202 may also include one or more memory units 272 (e.g., RAM, DRAM, ROM, and the like). The processor unit 270 may execute one or more programs 274, which may be stored in the memory 272, and the processor 270 may be operatively coupled to the memory 272, e.g., by accessing the memory via a data bus 276. The memory unit 272 may include data 277, and the processor unit 270 may utilize the data 277 in implementing the program 274. The program 274 may include instructions that, when executed by a processor, perform one or more operations associated with power utilization amongst one or more terminal systems, such as, e.g., a method having one or more features in common with the method 300 of FIG. 3 discussed below. For example, the program 274 may include instructions that, when executed by the processor 270, cause the system 202 to allocate instances of one or more computer processing applications $APP_1$, $APP_2$, $APP_3$ to some of the terminal processing systems 102. Each application may have an associated power consumption profile. The instances are allocated to the terminal processing systems 102 in accordance with the power consumption profiles and an aggregate power consumption capacity for the plurality of terminal processing systems. The power profiles may be stored as part of the data 277. The instances are allocated to the terminal processing systems in the plurality in a way that optimizes a number of users per unit power allocated to the plurality of terminal processing systems.

The system 202 may be implemented as a standalone system that is separate from the Data Center Controller 106 and the Terminal Systems 102. Alternatively, the Data Center Controller 106 may be configured to execute suitable software $SW_1$ that implements the functions described above when executed. Furthermore, one or more of the terminal systems 102 may be configured to execute suitable software that implements these functions. In addition, a remote Application Service Provider System 120 that communicates with the Data Center 200 via the network 199 may implement these functions.

The system 202 may also include well-known support circuits 278, such as input/output (I/O) circuits 279, power supplies (P/S) 280, a clock (CLK) 281, and cache 282, which may communicate with other components of the system, e.g., via the bus 276. The system 202 may optionally include a mass storage device 284 such as a disk drive, CD-ROM drive, tape drive, flash memory, or the like, and the mass storage device 284 may store processing instructions (e.g., program 274) and/or data 277. The system 202 may also optionally include a display unit 286. The display unit 286 may be in the form of a cathode ray tube (CRT), flat panel screen, touch screen, or other device that displays text, numerals, graphical symbols, or other visual objects. The system 202 may also include a user interface 288 to facilitate interaction between the system and a user. The user interface 288 may include a keyboard, mouse, light pen, game control pad, touch interface, or other device. The user interface may also include an audio I/O device, such as a speaker and/or microphone. Portions of the user interface 288 may include a graphical user interface (GUI) that can be displayed on the display unit 286 in order to facilitate user interaction with the system 202. In some implementations, the display unit may include simple status indicator lights (e.g., light emitting diodes) and the indicate lights may include switches and/or pushbuttons.

The system 202 may include a network interface 290, configured to enable the use of Wi-Fi, an Ethernet port, or other communication methods. The network interface 290 may incorporate suitable hardware, software, firmware or some combination thereof to facilitate communication via a telecommunications network, and may support data transport using an unreliable protocol in accordance with certain aspects of the present disclosure. The network interface 290 may be configured to implement wired or wireless communication over local area networks and wide area networks such as the Internet. The system 202 may send and receive data via one or more data packets over a network.

The above components may be implemented in hardware, software, firmware, or some combination thereof.

Method

Figure 3:
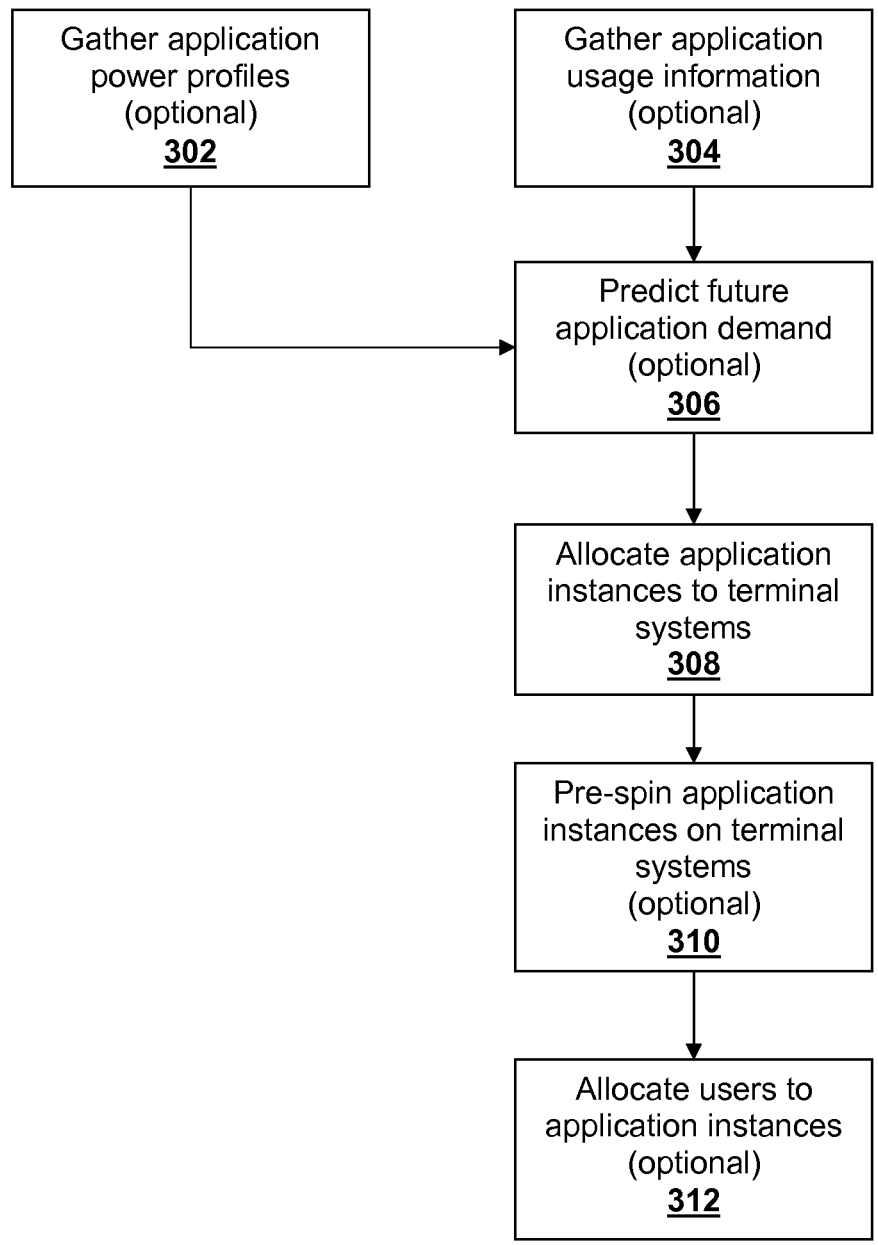
FIG. 3 is a flow diagram depicting an example of method for power utilization distribution in accordance with aspects of the present disclosure.

The systems described above may implement a power distribution method, a non-limiting example of which is shown in the flow diagram of FIG. 3. The method 300 may include optional stages of gathering application power profiles, indicated at 302 and gathering application usage information, indicated at 304. Application power profiles may include information regarding the power usage for one or more instances of a given application instance running on a given type of terminal system. Such information may be obtained by running instances of the application on a terminal system of the given type under different conditions and monitoring the power consumed by the terminal system. Examples of different conditions may include, but are not limited to, different numbers of users per instance, different processing loads for computation, graphics, or sound, differing frequency of access to memory or storage, and differing frequency and amount of use of I/O or network resources. The terminal system may be operated in a rack along with other terminal systems to determine the contribution of each terminal system to the power drawn by the rack. The application power profiles may include power consumption history for individual users. The application power profiles may include power consumption information including, peak power consumption under given conditions, average power consumption under given conditions, peak or average power consumption for all conditions tested, power consumption variation, expected power consumption under given conditions, power consumption at different stages of an application instance, and the like.

In some implementations, future application demand may be predicted, as indicated at 306. Cloud-based application servers often generate or otherwise have access to information on application usage. Sever operators can leverage this information in allocating application instances to terminal systems. Such information may correlate usage, e.g., in terms of number of application instances or power utilization, against other factors including, but not limited to time of day, day of week, month of year, geographic location, and user demographics. Application instances may then be allocated to corresponding terminal systems according to the aforementioned power profiles, as indicated at 308. In some implementations, the aggregate peak power for the instances allocated, e.g., to a given rack, could exceed the power consumption capacity for that rack if the expected power consumption for the rack at any given time is predicted to be less than the capacity.

The application power profiles may include power consumption history for individual users thereby taking into account individual user power consumption in allocating application instances. In particular instances may be allocated to the terminal processing systems in accordance with power consumption profiles for the corresponding applications and an aggregate power consumption capacity for a given set of terminal processing systems, e.g., in one rack, set of racks, server facility, or group of server facilities. The instances are allocated to a given set of terminal processing systems in a way that optimizes a number of users per unit power allocated to the set.

In some implementations, the allocation of application instances to terminal systems may make use of predicted demand information. For example, if it is determined at 306 that a certain first-person-shooter video game has a large user demand at 3:30 PM amongst male users between the ages of 12 and 17 in a particular geographic area then application instances may be assigned to terminal systems on servers that are best located to serve that area at that time.

In some implementations, a selected number of application instances may be pre-spun on selected terminal systems, as indicated at 310. In such implementations, an application instance may be pre-spun, e.g., by loading a copy of the application onto a designated terminal system before a user has been assigned to that instance. In this way, the application instance is ready for the user to begin using the application as soon as the user is allocated to the instance running on the terminal system. Such a capability enhances user experience by making the start of the application very fast since the user does not have to wait for the application instance to load onto the terminal system.

After application instances have been allocated to terminal systems and (optionally) after application instances have been pre-spun on selected terminal systems, users may be allocated to application instances, as indicated at 312. In some implementations, the number of application instances that are pre-spun may be determined according to anticipated demand, e.g., as discussed above.

Aspects of the present disclosure address issues of power usage and application start-up time in cloud based computing. The use of power profiles allows efficient allocation of application instances to terminal systems. Pre-spinning applications in response to anticipated demand allows for very fast application starts.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
    allocating instances of the one or more computer processing applications to a subset of terminal processing systems in a plurality of terminal processing systems, wherein the terminal processing systems in the plurality are coupled to a network and wherein each of the computer processing applications is configured to be accessed by one or more remote client devices via the network, each client device having one or more associated users, wherein each of the one or more computer processing applications has an associated power consumption profile, wherein the instances are allocated to the terminal processing systems in the plurality in accordance with the power consumption profiles for the one or more applications and an aggregate power consumption capacity for the plurality of terminal processing systems, wherein the instances are allocated to the terminal processing systems in the plurality in a way that optimizes a number of users per unit power allocated to the plurality of terminal processing systems;
    allocating one or more users associated with the one or more client devices to one or more corresponding instances of the instances that are allocated to the terminal processing systems in the plurality;
    determining an anticipated user demand for at least a subset of the one or more applications and pre-launching one or more of the instances allocated to the terminal processing systems in the plurality before allocating a corresponding one or more users to the pre-launched instances.

2. The method of claim 1, wherein the plurality of terminal processing systems include at least a subset of terminal processing systems located within a common rack at a data center.

3. The method of claim 1, further comprising determining the aggregate power consumption capacity for the plurality of terminal processing systems.

4. The method of claim 1, further comprising determining the power consumption profiles of the one or more terminal processing systems.

5. The method of claim 1, further comprising determining the associated power consumption profiles for the one or more computer processing applications.

6. The method of claim 1, further comprising determining the associated power consumption profiles for the one or more computer processing applications, wherein the associated power consumption profiles take into account past power consumption data for one or more individual users.

7. The method of claim 1, further comprising taking into account an anticipated user demand for at least a subset of the one or more applications in allocating the instances to the terminal processing systems in the plurality.

8. The method of claim 1, further comprising determining an anticipated user demand for at least a subset of the one or more applications and pre-launching one or more of the instances allocated to the terminal processing systems in the plurality before allocating a corresponding one or more users to the pre-launched instances.

9. A system comprising:
    a processor, and
    a memory coupled to the processor;
    wherein the processor is configured to perform a method of allocating instances of the one or more computer processing applications to a subset of terminal processing systems in a plurality of terminal processing systems, wherein the terminal processing systems in the plurality are coupled to a network and wherein each of the computer processing applications is configured to be accessed by one or more remote client devices via the network, each client device having one or more associated users, wherein each of the one or more computer processing applications has an associated power consumption profile, wherein the instances are allocated to the terminal processing systems in the plurality in accordance with the power consumption profiles for the one or more applications and an aggregate power consumption capacity for the plurality of terminal processing systems, wherein the instances are allocated to the terminal processing systems in the plurality in a way that optimizes a number of users per unit power allocated to the plurality of terminal processing systems;

allocating one or more users associated with the one or more client devices to one or more corresponding instances of the instances that are allocated to the terminal processing systems in the plurality;

determining an anticipated user demand for at least a subset of the one or more applications and pre-launching one or more of the instances allocated to the terminal processing systems in the plurality before allocating a corresponding one or more users to the pre-launched instances.

10. A non-transitory computer readable medium having processor-executable instructions embodied therein, wherein execution of the instructions by a processor causes the processor to implement a method of allocating instances of the one or more computer processing applications to a subset of terminal processing systems in a plurality of terminal processing systems, wherein the terminal processing systems in the plurality are coupled to a network and wherein each of the computer processing applications is configured to be accessed by one or more remote client devices via the network, each client device having one or more associated users, wherein each of the one or more computer processing applications has an associated power consumption profile, wherein the instances are allocated to the terminal processing systems in the plurality in accordance with the power consumption profiles for the one or more applications and an aggregate power consumption capacity for the plurality of terminal processing systems, wherein the instances are allocated to the terminal processing systems in the plurality in a way that optimizes a number of users per unit power allocated to the plurality of terminal processing systems;

allocating one or more users associated with the one or more client devices to one or more corresponding instances of the instances that are allocated to the terminal processing systems in the plurality;

determining an anticipated user demand for at least a subset of the one or more applications and pre-launching one or more of the instances allocated to the terminal processing systems in the plurality before allocating a corresponding one or more users to the pre-launched instances.

* * * * *